United States Patent
Le Pera et al.

(10) Patent No.: US 12,483,338 B2
(45) Date of Patent: Nov. 25, 2025

(54) QUANTUM KEY DISTRIBUTION SYSTEMS AND ASSOCIATED METHODS

(71) Applicants: EUTELSAT S A, Issy-les-Moulineaux (FR); NEDERLANDSE ORGANISATIE VOOR TOEGEPAST-NATUURWETENSCHAPPELIJK ONDERZOEK (TNO), The Hague (NL)

(72) Inventors: Alessandro Le Pera, Issy-les-Moulineaux (FR); Daniele Vito Finocchiaro, Issy-les-Moulineaux (FR); Bob Petrus Franciscus Dirks, Leiden (NL); Ivan Ferrario, Delft (NL)

(73) Assignees: EUTELSAT SA, Issy-les-Moulineaux (FR); NEDERLANDSE ORGANISATIE VOOR TOEGEPAST-NATUURWETENSCHAPPELIJK ONDERZOEK (TNO), s-Gravenhage (NL)

( * ) Notice: Subject to any disclaimer, the term of this patent is extended or adjusted under 35 U.S.C. 154(b) by 185 days.

(21) Appl. No.: 18/264,168

(22) PCT Filed: Feb. 3, 2022

(86) PCT No.: PCT/EP2022/052600
§ 371 (c)(1),
(2) Date: Aug. 3, 2023

(87) PCT Pub. No.: WO2022/167534
PCT Pub. Date: Aug. 11, 2022

(65) Prior Publication Data
US 2024/0097794 A1    Mar. 21, 2024

(30) Foreign Application Priority Data
Feb. 5, 2021 (EP) .................................. 21305157

(51) Int. Cl.
*H04B 10/70* (2013.01)

(52) U.S. Cl.
CPC .................................. *H04B 10/70* (2013.01)

(58) Field of Classification Search
CPC .............................. H04B 10/70; H04L 9/08
(Continued)

(56) References Cited

U.S. PATENT DOCUMENTS 7,460,670 B1 * 12/2008 Elliott .................. H04L 9/0858
709/224
8,861,735 B2 * 10/2014 Brodsky ............. H04J 14/0283
380/263

(Continued)

FOREIGN PATENT DOCUMENTS

WO    WO 2012/074369 A1    6/2012

OTHER PUBLICATIONS

International Search Report as issued in International Patent Application No. PCT/EP2022/052600, dated May 17, 2022.
(Continued)

*Primary Examiner* — Kaylee J Huang
(74) *Attorney, Agent, or Firm* — Pillsbury Winthrop Shaw Pittman LLP (57) ABSTRACT

An Entangled photons distribution and measurement system includes a photon source including two outputs, able to generate a pair of entangled photons, the first photon being emitted on the first output and the second photon on the second output, a first optical link connected to the first output of the photons source, to deliver the entangled photons to a first device, an optical switch to route photons from the second output of the photons source to the first or second output of the optical switch, a second optical link connected to the first output of the optical switch, to deliver the entangled photons to a second device, and a measure-
(Continued)

ment device connected to the second output of the optical switch, wherein the optical switch is configured to switch between its first and second output to switch between two operating modes.

8 Claims, 3 Drawing Sheets

(58) Field of Classification Search
USPC .................................................. 380/256, 255
See application file for complete search history.

(56) References Cited

U.S. PATENT DOCUMENTS

| | | | |
|---|---|---|---|
| 9,313,180 B1 * | 4/2016 | Gray | H04W 12/04 |
| 2013/0208894 A1 * | 8/2013 | Bovino | H04L 9/0852 |
| | | | 380/278 |
| 2018/0108804 A1 * | 4/2018 | Ellis | H10H 20/81 |
| 2018/0152295 A1 * | 5/2018 | Drost | H04L 9/0858 |
| 2020/0153619 A1 | 5/2020 | Ribordy | |

OTHER PUBLICATIONS

Vergoossen, Y., et al., "Satellite quantum communications when man-in-the-middle attacks are excluded," arxiv.org, Mar. 2019, XP081162328, 6 pages.

* cited by examiner

QUANTUM KEY DISTRIBUTION SYSTEMS AND ASSOCIATED METHODS

CROSS-REFERENCE TO RELATED APPLICATIONS

This application is the U.S. National Stage of PCT/EP2022/052600, filed Feb. 3, 2022, which in turn claims priority to European patent application number 21305157.6 filed Feb. 5, 2021. The content of these applications are incorporated herein by reference in their entireties.

TECHNICAL FIELD

The technical field of the invention is the field of quantum cryptography.

The present invention concerns a system for providing entangled photons and quantum key distribution using such photons, the system being able to perform in at least two different operating modes thanks to an optical switch, the system being able to carry out different quantum key distribution protocols separately depending on the operating mode or even simultaneously when the optical switch is tuneable.

STATE OF THE ART

Quantum Key Distribution ("QKD") includes different protocols that can be used for generating encryption keys using properties of quantum physics. QKD can be deployed over terrestrial networks, for example using optical fibre, as well as through free space over satellite links. In particular, the use of a satellite allows to perform QKD among larger distances than what is achievable today on terrestrial networks thanks to the lower loss.

Different protocols have been proposed for implementing QKD over satellite. A full key-establishment protocol between two partners, the two partners being usually on ground, foresees an exchange of photons with specific quantum properties, and the execution of additional 'classical' steps.

The two algorithms that have received the most consensus among specialists are:
- "entanglement-based" protocols, where a photon source on the satellite sends pairs of entangled photons to two receivers, each receiving one of the photons of the pair. This solution is proven information theoretically secure without the need for security assumptions for the source, which is foreseen to be on the satellite. The first protocol using entangled photon has been described by Ekert and is known as E91. A more practical variant for QKD is BBM92, which is simpler to implement than E91.
- "prepare-and-measure" protocols, where a photon with specific properties is generated onboard and sent to a single receiver, and the process is repeated with a second receiver. This solution requires the satellite to be a "trusted node", as it is an active participant in the overall key-establishment protocol. This means that additional security assumptions have to be made for the source (here in the satellite) as information on the key will be (temporarily) stored on board. The basic protocol, using true single photons, was described by Bennet and Brassard and is known as BB84. This was later extended for weak coherent pulses and the use of decoy states.

Other variants exist, that share fundamentally the same properties.

In practice, satellites designed today implement either one or the other 1.0 protocol, as they work in different ways and require different hardware. Most satellite implementations use BB84 with decoy because higher key rate can be achieved.

In C. Bonato, A. Tomaello, V. Da Deppo, G. Naletto and P. Villoresi, *"Feasibility of satellite quantum key distribution"*, New Journal of Physics, vol. 11, April 2009, the authors analyse four different scenarios for the E91 protocol, among which:
- In one scenario the photon source is in the satellite, with two ground receivers,
- In another scenario the photon source is in the satellite, with one local receiver and another receiver on the ground.

In Juan Yin et al., "Satellite-to-Ground Entanglement-Based Quantum Key Distribution", Physical Review Letters 119, 2017, it is described the BBM92-with-onboard-receiver as implemented in the Chinese "Micius" satellite.

Comparing BB84 and BBM92, the latter is the "most secure" QKD protocol in the sense that it does not require any trust on the source, here located in the satellite, the receivers being exterior to the satellite (e.g. on ground). Although BBM92 is less susceptible to loss, key rates will be low as two simultaneous links are needed, increasing the total link loss. Therefore, the price per key will be higher seen the high investment cost of such a satellite, although this may be justified when ultimate security is needed. Therefore, a major obstacle for building such a satellite is that, after a high investment, it can be used only in situations where a high security is required, so that the high price per key is justified.

The BB84 protocol, on the other hand, has a medium security level as it requires the satellite to be a trusted node (that stores a copy of the key), but has a higher performance in terms of achievable key rate, and therefore a lower price per key. However, additional security measures are needed to protect the satellite against potential eavesdropping from third parties, which can be very costly.

To address the drawbacks mentioned before, there is a need for a solution having a fixed contained cost and that is able to propose different security levels and performance levels in quantum key distribution.

SUMMARY OF THE INVENTION

The present invention solves the above-mentioned problems by providing a solution able to operate in different modes, wherein at least two modes enable to implement two different quantum key distribution protocols with different security levels and performance levels. In one operating mode, the solution allows to distribute entangled photons that can be used to establish shared "qu-bits" in two quantum computers. In an embodiment, the present invention even enables to implement the two QKD protocols simultaneously.

According to a first aspect of the invention, this is satisfied by providing an Entangled photons distribution and measurement system comprising:
  a photon source comprising a first and second outputs, the photon source being able to generate a pair of entangled photons comprising a first and second photon, the first photon being emitted on the first output and the second photon being emitted on the second output, a first optical link connected to the first output of the photons source, the first optical link being configured to deliver the entangled photons to a first device, the entangled photons distribution and measurement system being characterized in that it comprises:

a first optical switch connected to the second output of the photons source and comprising a first and second outputs, the first optical switch being configured to route photons from the second output of the photons source to the first or to the second output of the first optical switch, a second optical link connected to the first output of the first optical switch, the second optical link being configured to deliver the entangled photons to a second device, a measurement device connected to the second output of the first optical switch, a memory connected to the measurement device, and in that the first optical switch is configured to switch between its first and second output to switch between two operating modes of the system.

Thanks to the invention, it is possible to switch between two different quantum key distribution operating modes. The system according to the invention comprises an optical switch and a minimal number of components to perform in both operating modes so as to reduce costs as compared to providing an independent system for each operating mode and to be able to propose several security and performance levels inherent to each operating mode. For example, the QKD methods in each operating modes can be based on the BBM92 protocol, but with different locations of the recipient, for example one method comprising an on-board or "local" recipient and an on-ground or "outside" recipient and the other method comprising both recipients on the ground or "outside" of the system.

The present invention proposes a unique satellite architecture able to implement one of two quantum key distribution methods at any moment, by simple reconfiguration and even, as described later, both at the same time thus permitting a hybrid mode. On top of QKD applications, entangled photons can be distributed for other uses (e.g. establishing shared qu-bits among quantum computers, as foreseen in the European Quantum Communication Infrastructure (QCI)).

The advantage of a dual-use architecture, as proposed in the current invention, is to be able to deliver several types of services with different security and performance levels using a unique system. For example, the present invention can propose quantum key distribution methods with the following characteristics:

High-security, low performance, high cost per bit ("untrusted" mode);

Medium-security, high performance, low cost per bit ("trusted" mode);

longest possible key with configurable level of security ("hybrid" mode).

The QKD system according to the invention may also have one or more of the following characteristics, considered individually or according to any technically possible combinations thereof:

The system further comprises:

a second optical switch located between the first output of the photons source and the first optical link, the second optical switch comprising a first and second outputs, the first output of the second optical switch being connected to the first optical link, a beam splitter located between the second output of the first optical switch and the measurement device, the beam splitter comprising a first and second inputs and a first and a second outputs, the first input of the beam splitter being connected to the second output of the second optical switch, the second input of the beam splitter being connected to the first output of the first optical switch, the first output of the beam splitter being connected to a third optical switch and the second output of the beam splitter being connected to the measurement device, the beam splitter being configured to split received photon streams between its first and second outputs, the splitting verifying a predetermined split ratio between the first and second outputs of the beam splitter, the third optical switch comprising an input connected to the first output of the beam splitter and a first and second output, the first output of the third beam splitter being connected to the second optical link and the second output of the third optical switch being connected to the first optical link, and in that the second optical switch and the third optical switch are configured to switch between their first and second output simultaneously with the first optical switch so as to switch between the two operating modes of the system.

the beam splitter is able to vary its predetermined split ratio.

the system is embedded in a satellite and in that the optical links are formed by optical trains, sending and receiving telescopes and free space channel between the sending and receiving telescopes.

the system in one of the two operating modes is able to carry out an "entanglement-based" trusted Quantum Key Distribution protocol and in the other of the two operating modes the system is able to carry an "entanglement-based" untrusted Quantum Key Distribution protocol.

Another aspect of the invention relates to a Quantum Key Distribution method carried out by the entangled photons distribution and measurement system according to the invention, the method comprising the steps of:

generating at least a first pair of entangled photons by the photons source, the first pair of entangled photons comprising at least a first and a second photons, routing the first entangled photon of the first pair of entangled photons via the first optical link to deliver the first entangled photon to the first device and the second entangled photon of the first pair of entangled photons via the optical switch and via the second optical link the second entangled photon to second devices, switching the optical switch from its first output to its second output, generating at least a second pair of entangled photons by the photons source, the second pair of entangled photons comprising at least a first and a second photons, routing the first entangled photon of the second pair of entangled photons via the first optical link to deliver the first entangled photon of the second pair to the first device and the second entangled photon of the second pair of entangled photons via the optical switch to deliver the second entangled photon of the second pair to the measurement device, measuring, by the measurement device, a property of the received second entangled photon of the second pair and storing, in the memory, the measure of the property of the received second entangled photon of the second pair of entangled photons, generating a first cryptographic key based on the measure of the property of the received second entangled photon of the second pair, generating at least a third pair of entangled photons by the photons source, the third pair of entangled photons comprising at least a first and a second photons, routing the first entangled photon of the third pair of entangled photons via the second optical link to deliver the first entangled photon of the third pair to the second device and the second entangled photon of the third pair of entangled photons via the optical switch to deliver the second entangled photon of the third pair to the measurement device, measuring, by the measurement device, a property of the received second entangled photon of the third pair and storing, in the memory, the measure of the property of the received second entangled photon of the third pair of entangled photons, generating a second cryptographic key based on the measure of the property of the received second entangled photon of the third pair, sending the first cryptographic key to the first device, encrypted using the second cryptographic key.

The QKD method according to the invention may also have one or more of the following characteristics, considered individually or according to any technically possible combinations thereof:

the method comprises the steps of:
generating at least a first and a second pairs of entangled photons by the photons source, the first pair of entangled photons comprising at least a first and a second photons, the second pair of entangled photons comprising at least a first and a second photons, routing the first entangled photons of the first pair of entangled photons and of the second pair of entangled photons via the second optical switch and via the first optical link to deliver the two first entangled photons of the first and second pairs of entangled photons to the first device, routing the second entangled photon of the first pair of entangled photons via the first optical switch, via the beam splitter and via the second optical link to deliver the second entangled photon of the first pair to the second device, routing the second entangled photon of the second pair of entangled photons via the first optical switch and via the beam splitter to deliver the second entangled photon of the second pair to the measurement device, measuring, by the measurement device, a property of the received second entangled photon of the second pair of entangled photons and storing, in the memory, the measure of the property of the received second entangled photon of the second pair of entangled photons, generating a first cryptographic key based on the measure of the property of the received second entangled photon of the second pair, switching the first, second and third optical switches from their first output to their second output, generating at least a third and a fourth pairs of entangled photons by the photons source, the third pair of entangled photons comprising at least a first and a second photons, the fourth pair of entangled photons comprising at least a first and a second photons, routing the first entangled photons of the third pair of entangled photons and of the fourth pair of entangled photons via the first optical switch and via the second optical link to deliver the two first entangled photons of the third and fourth pairs of entangled photons to the second device, routing the second entangled photon of the third pair of entangled photons via the second optical switch, via the beam splitter and via the first optical link to deliver the second entangled photon of the third pair to the first device, routing the second entangled photon of the fourth pair of entangled photons via the second optical switch and via the beam splitter to deliver the second entangled photon of the fourth pair to the measurement device, measuring, by the measurement device, a property of the received second entangled photon of the fourth pair of entangled photons and storing, in the memory, the measure of the property of the received second entangled photon of the fourth pair of entangled photons, generating a second cryptographic key based on the measure of the property of the received second entangled photon of the fourth pair, sending the first cryptographic key to the first device, encrypted using the second cryptographic key.

Another aspect of the invention relates to a computer program product comprising instructions which, when the program is executed by a computer, causes the computer to carry out one of the methods according to the invention.

Another aspect of the invention relates to a computer-readable medium comprising instructions which, when executed by a computer, cause the computer to carry out one of the methods according to the invention.

The invention finds a particular interest in Quantum Key Distribution by satellite, where the satellite embeds the system of the invention, enabling to switch from high cost per secure bit, low performance (key rate) and high security protocols to low cost per secure bit, high performance and medium security protocols easily, enabling different services for different users in the same compact system without having direct manual access to the system as it is the case in space.

BRIEF DESCRIPTION OF THE FIGURES

Other characteristics and advantages of the invention will become clear from the description that is given thereof below, by way of indication and in no way limiting, with reference to the appended figures, among which.

DETAILED DESCRIPTION

For greater clarity, identical or similar elements are marked by identical reference signs in all of the figures.

The figures are provided for information purposes only and are in no way limiting the invention to their disclosure.

Figure 1:
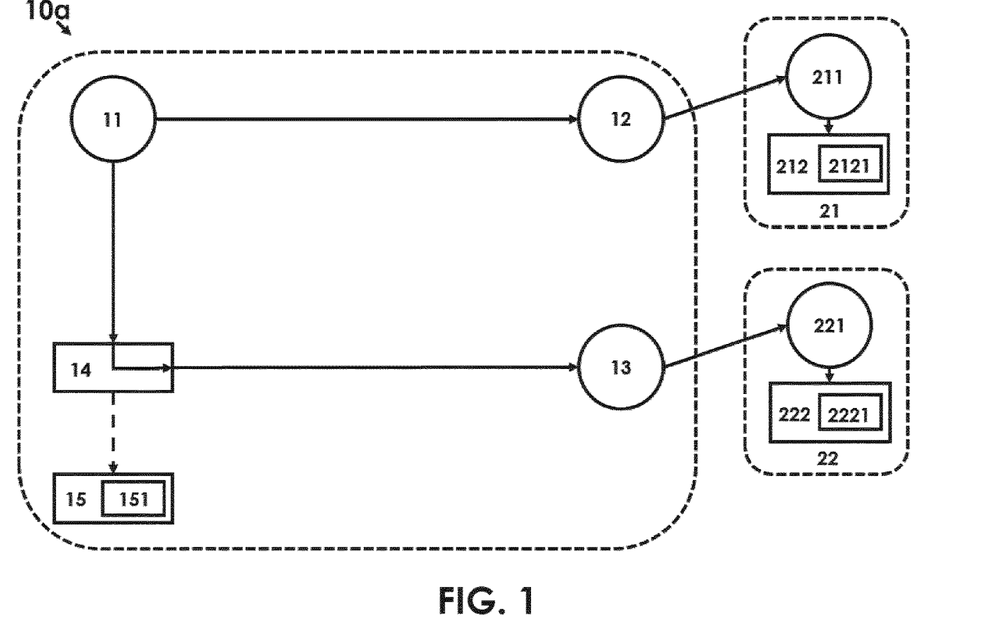
FIG. 1 is a schematic representation of a QKD system according to an embodiment of the invention in a first operating mode.

FIG. 1 is a schematic representation of a QKD system according to an embodiment of the invention in a first operating mode.

The system 10a according to a first embodiment of the invention comprises a photon source 11, two optical links 12 and 13, an optical switch 14, a measurement device 15 and a memory 151. The system 10a communicates with two user devices 21 and 22 through the optical links 12 and 13 it comprises.

Figure 2:
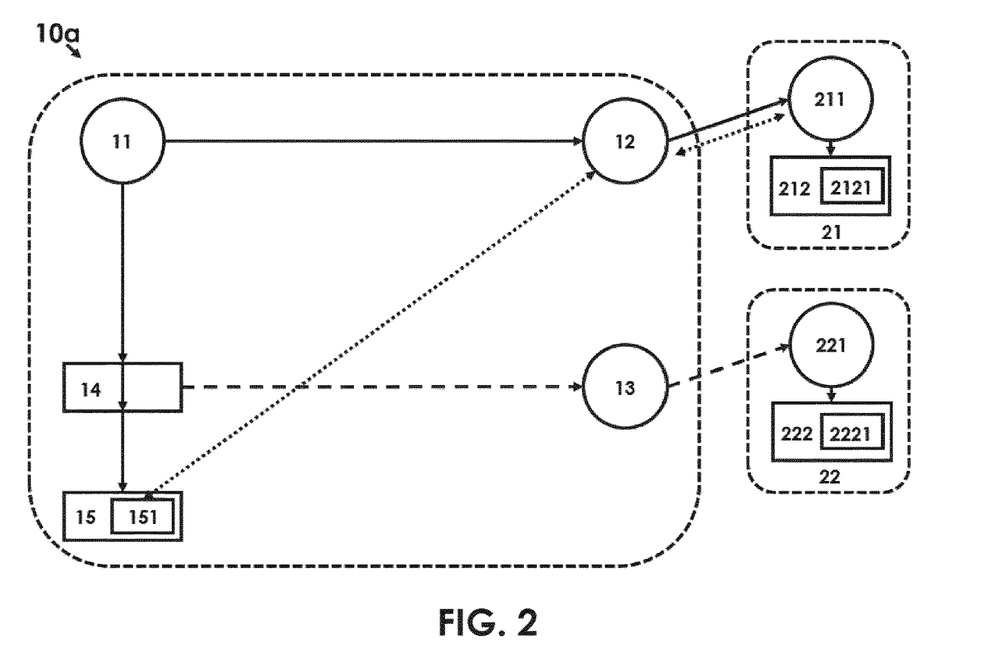
FIG. 2 is a schematic representation of a QKD system according to an embodiment of the invention in a second operating mode.

The Quantum Key Distribution system 10a represented at FIG. 1 is in a first operating mode called an "untrusted" mode because of the absence of a trusted node between the user devices. The Quantum Key Distribution System 10a in a second operating mode is represented at FIG. 2 called a "trusted" mode because of the presence of a trusted node (system 10a or 10b) between the user devices. It has to be noted that the "untrusted" mode is more secure than the "trusted" mode as the presence of the trusted node between the two user devices increases risks of keys being compromised, thus lowering security. It further has to be noted that the photon source 11 of the systems 10a and 10b does not need to be trusted for performing the methods of the invention.

In the first operating "untrusted" mode, both user devices 21 and 22 are outside the system 10a, that is they are not located at the same place as the system 10a. For example, when the system 10a is embedded in a satellite, the user devices 21 and 22 are not embedded in the satellite. In that case, the optical links 12 and 13 comprise telescopes on both ends of the optical links, for example, for each link: one telescope 12 in the system 10a and one telescope 211 in the user device 21. In another case, the optical links 12 and 13 can be optical fibre links, for example when the system 10a and both user devices 21 and 22 are on the ground. The optical links 21 and 22 are any component or device that makes it possible for the system 10a to send entangled photons to a user device 21 and/or 22.

Two photons are entangled when the quantum state of a photon of a pair of entangled photons cannot be described independently of the quantum state of the other one.

The photon source 11 is able to generate at least one pair of entangled photons. The photon source 11 will not be described as this is not the object of the invention, but the photon source 11 can be any component or device that can generate and emit at least entangled photons, for example using solutions where continuous laser light is injected in a non-linear crystal in which entangled photons pairs are created, followed by a means to separate the two photons of the pair. The photon source 11 therefore comprises at least two outputs to emit a photon on each output, the first photon of a pair of entangled photons being emitted on one of the two outputs, the second photon of the pair of entangled photons being emitted on the other of the two outputs. It is to be understood that the description focuses on using pairs of photons, and in particular some methods comprise generating only one pair of photons. This is for explanation only, and the invention encompasses methods where several pairs of photons are sent. Indeed, in order to create a key, many photons (not just one) are needed, as a part of the measurements will be used to estimate and compensate the noise level and the probability of eavesdropping, i.e. for privacy amplification. This is a well-known topic that is not part of the invention At FIGS. 1 to 3, the links represented in solid continuous line are optical links that are active, i.e. represent the path followed by photons in a certain configuration. The links represented in dashed lines are inactive optical links, i.e. represent paths that photons cannot follow in that configuration. The links represented in dotted lines (or small dashes) are common communication links, such as radio communication links, used to perform the "classical" steps in the QKD protocol. Optical links can be formed by optical trains, i.e. arrangements of optical components to guide photons, and can also comprise telescopes and free space channels (e.g. vacuum or air).

The system 10a further comprises an optical switch 14, the optical switch comprising at least one input and at least two outputs, the optical switch receiving photons at its input and being able to route the photons to one of its outputs. When the switch 14 changes the output it routes the received photons to, it is said to be "switching". The action of "switching" the optical switch 14 is the action of sending an instruction to the optical switch 14 to change the output it routes the received photons to, and the optical switch 14 effectively changing its routing output. This is represented at FIGS. 1 and 2 with a solid line for the routing output in use and a dashed line for the disabled output. The optical switches can be implemented using tuneable beam splitters, with switching the tuneable beam splitter comprising changing a predetermined split ratio of 100/0 to a predetermined split ratio of 0/100, where 100/0 means that 100% of received photons are routed towards the first output and 0% are routed towards the second output of the tuneable beam splitter.

In system 10a, the first optical link 12, for example a telescope, is optically connected to the photon source 11 so as to receive photons from the photon source 11. This is represented by a solid line. The optical switch 14 is optically connected to the second output of the photon source 11 so as to receive photons from the photon source 11. Therefore, a first photon of a pair of entangled photons can be sent directly to user device 21 via the optical link 12, and a second photon of the pair of entangled photons can be sent to the other user device 22 via the optical switch 14 and via optical link 13 so as to carry out a BBM92 protocol with two on-ground receivers, or at least with two receivers exterior to the system 10a. This method implemented in the first operating mode of system 10a is represented at FIG. 4.

Figure 4:
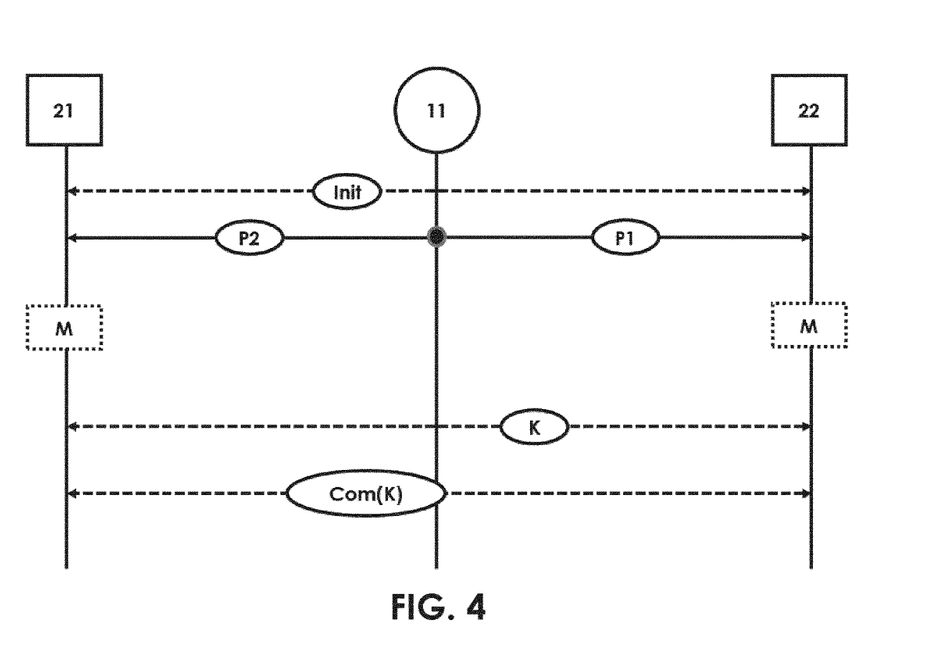
FIG. 4 is a schematic representation of a method carried out by the system according to an embodiment of the invention.

FIG. 4 is a schematic representation of a method carried out by the system according to an embodiment of the invention.

The method of FIG. 4 will later be referred to as an "untrusted" method, as a key is distributed between user devices 21 and 22 without a trusted component between them storing the key or part of the key.

This known method comprises a first step "init" that comprises the sharing of a secret for future authentication between user devices 21 and 22. This can be done during factory initialization or later using a known process. This secret is used for the first communication. For any subsequent communication, Alice and Bob use a small part of the future generated key (using QKD) for authentication.

Then, as explained previously, the photon source 11 sends a first photon P1 of a pair of entangled photons to user device 21 and a second photon P2 of the same pair of entangled photons to user device 22.

As represented at FIG. 1, each user device 21 and 22 comprises its own measurement device 212 and 222, the measurement devices 212 and 222 being trusted and comprising each their own memory 2121 and 2221 to store a key and/or a measure in a trusted manner. The invention also covers a system where the memory is not part of the measurement device, i.e. the memory and the measurement device are two distinct components or devices. The invention also covers a system where the measurement device comprises a memory, preferably a short-term memory, and where the system further comprises a memory device, which is preferably a long-term memory. This is not represented for clarity of the drawings.

Going back to FIG. 4, each user device 21 and 22 receiving a photon P1 or P2 measures a property of the received photon during a step "M" using their measurement device 212 or 222. Said property can be polarization of the photon, but it can be any other property in which the photons are entangled, as long as both user devices 21 and 22 measure the same property of the received photons of the same pair of entangled photons.

After each measurement of a property of the entangled photons during the step "M" in a randomly selected basis, each user device 21 and 22 converts its measurement results to bits or any format.

In the BBM92 protocol, each user device 21 and 22 then reduces its results down to the results measured in the same basis as the other user device, then uses a part of its measurements to estimate the quantum bit error rate and generates a secure key K from the rest of its measurement results, thus creating a common key "K". Each user device 21 and 22 stores its key in its memory 2121 and 2221. Using the key K, user devices 21 and 22 can then encrypt their communications to communicate in a step "Com", or generate derived keys to be used for that purpose.

In a second operating "trusted" mode, the optical switch 14 is switched to its second output, thus routing photons received at its input towards the measurement device 15. The photons received by the optical switch 14 are consequently not routed towards the second optical link 13.

Figure 5:
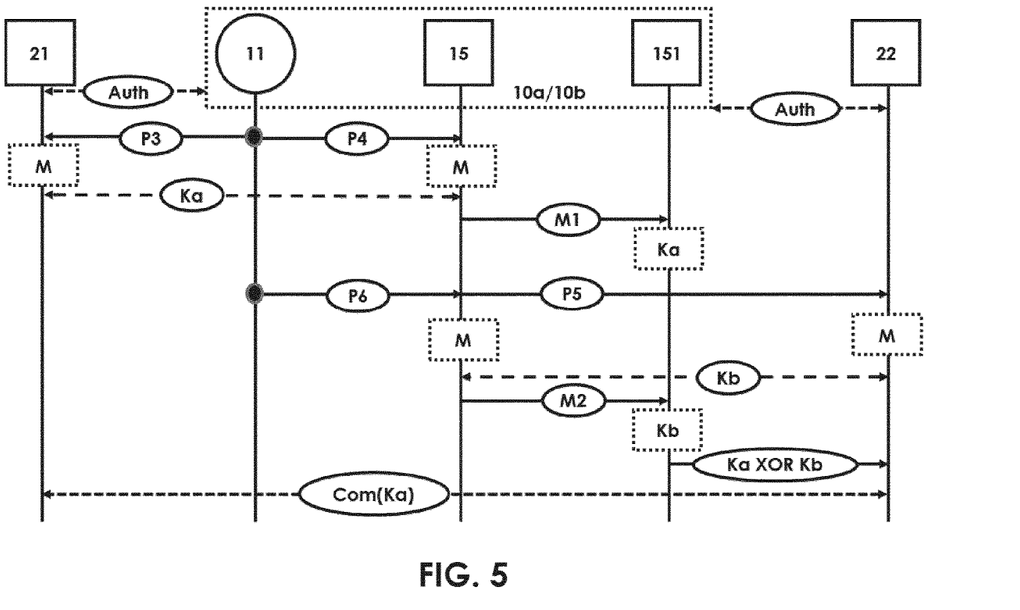
FIG. 5 is a schematic representation of another method carried out by the system according to an embodiment of the invention.

In this second operating mode represented at FIG. 2, and which steps are described at FIG. 5, a user device receives one photon of the pair of entangled photons generated by the photon source 11 and the measurement device 15 receives the other photon of the pair of entangled photons generated by the photon source 11. Following the steps of the BBM92 protocol, as described above, this permits to have a common trusted key (e.g. Ka in FIG. 5) between the system 10a and the user device 21 or 22. The same process is repeated with the other user device 21 or 22 thanks to the optical switch 14, to obtain another trusted key (e.g. Kb in FIG. 5) between the system 10a and the other user device 21 or 22. The system 10a can therefore securely communicate to one user device the key established with the other device. This permits to have a key to communicate between user device 21 and user device 22, with the system 10a acting as a trusted central entity.

The method of FIG. 5 will later be referred to as a "trusted" method, as a key is distributed between user devices 21 and 22 with a trusted component (system 10a and in particular measurement device 15) between them storing the key or part of the key.

FIG. 5 is a schematic representation of a method in a "trusted" mode carried out by the system according to an embodiment of the invention.

This other method comprises two first authentication steps "Auth" that comprises the sharing of a secret for future authentication between user device 21 and system 10a/10b and between user device 22 and system 10a/10b. This can be done during factory initialization or later using a trusted known process. Overall, the different steps of this other method resemble the BB84 protocol, with the difference that the same entangled photon source is used as for BBM92.

The photon source 11 then sends a first photon P3 of a pair of entangled photons to user device 21 and a second photon P4 of the same pair of entangled photons to the on-board measurement device 15.

Then, the user device 21 receiving the photon P3 and the on-board measurement device 15 receiving the photon P4 measure a property of the received photon during a step "M". Said property can be polarization of the photon, but it can be any other property, as long as both user device 21 and measurement device 15 measure the same property of the received photons of the same pair of photons entangled in this property.

As mentioned previously for the method of FIG. 4, this permits to create a first key Ka shared by the user device 21 and the system 10a and in particular with the measurement device 15. The measurement device 15 stores the measure in the memory 151 in a step "M1" represented at FIG. 5. It has to be noted that the measurement device 15 as well as all the other measurement devices in the specification have to be trusted parts of the system. The key Ka is then generated from the measurement carried out previously and can also be stored in the memory 151.

Then, in the second part of the method, a key Kb shared by the user device 22 and the system 10a will be created.

To switch the emission of the first photon of the pair of entangled photons generated by the photon source 11 at its first output from the first user device 21 to the second user device 22 there are several possibilities, all of which are encompassed in the scope of the present invention. If the optical link 12 is implemented as a telescope, the telescope can be directed first towards the first user device 21 in the first part of the method and then towards the second user device 22 in the second part of the method, therefore using the same telescope and the same optical route within the system 10a to route the photons to each user device. If the optical link 12 is implemented as an optical fibre, an optical switch (not represented) is needed to switch between the first and second user device 21 and 22. Being able to switch between user device 21 and 22 permits to implement the first part of the method represented at FIG. 5 and then the second part of the method represented at FIG. 5, thus enabling to create a common communication key between user devices 21 and 22.

Once the output of the photon source 11 has been switched from user device 21 to user device 22, the second part of the method of FIG. 5 is carried out, that is the photon source 11 sends a first photon P5 of a pair of entangled photons to user device 22 and a second photon P6 of the same pair of entangled photons to the on-board measurement device 15.

As mentioned previously, this permits to create a second key Kb between the user device 22 and the system 10a and in particular with the measurement device 15. The measurement device 15 transfers the measurement of the property and/or the key Kb to the memory 151 in a step "M2" represented at FIG. 5. Therefore, both the user device 22 and the system 10a can communicate in an encrypted way using their shared key Kb.

As the user device 21 and the system 10a both know key Ka, and the user device 22 and system 10a both know key Kb, the user devices 21 and 22 can communicate after any device or component comprised in the system 10a sends the key Ka encrypted with the key Kb to user device 22 in a step "XOR", so that user device 22 then knows the key Ka and can communicate with the user device 21 using this key Ka. Note that this also works when any device or component comprised in the system 10a sends the key Kb encrypted with the key Ka to user device 21 so that user device 21 then knows the key Kb and can communicate with the user device 22 using this key Kb.

Thanks to the invention, it is possible, by simply switching the optical switch 14, to change operating modes and, using a single system 10a, to switch between carrying out the method of FIG. 4 and carrying out the method of FIG. 5.

The method of FIG. 4 is very secure, as it does not need a trusted "middleman", i.e. a trusted component holding two keys Ka and Kb, but has the following drawbacks:
  The performance is relatively low. In fact, the optical link budget applies to the full path from device 11 to device 21 plus device 11 to device 22, with ~80 dB (2×40 dB) of losses in the case of operation from a geostationary satellite for a specific foreseen optical implementation, due to the fact that a success transmission of photons is associated to the proper reception of both photons of an entangled couple, i.e. the individual path losses (expressed in dB) are summed (Joint Probability of receiving both entangled photons).
  User device 21 and user device 22 must each properly receive one of the entangled photons:
    For applications where the system 10a is embedded in a GEO (Geosynchronous Equatorial Orbit) satellite, this means that the two user devices 21 and 22 must be in line-of-sight of the satellite at same time, i.e. within the coverage limit (about 10000 km), without cloud coverage and with limited background light (e.g. from the Sun, stars, atmosphere, and reflection from the spacecraft) to avoid too low signal to noise ratio.
    Each ground receiver (user devices 21 and 22) needs to remain properly aligned with respect to the Satellite transmitter for the entire transmission time
  For applications from LEO (Low Earth Orbit) satellite, the same conditions apply, but the coverage is smaller (about 1000 km between two sites on ground) and the link time is limited (determined by the orbit).
The method of FIG. 5 has the following advantages:
  The communication with user devices 21 and 22 can be done in separate moments, e.g. as soon as good weather conditions are possible: there is no need for simultaneous delivery of photons,
  In particular, using a LEO satellite it is possible to cover the whole Earth, as a LEO satellite will typically cover the whole Earth within a day.
  For a certain duration of visibility, the performance is better than in the method of FIG. 4, as the optical link budget applies only to one link (from the system 10a to a user device 21 or 22), so with ~40 dB of losses in case of a specific optical implementation in GEO, as the path loss is dependent only on single-end probability of photon reception (rather than the joint probability in the method of FIG. 4).
But, the method of FIG. 5 has the following drawbacks:
  The memory 151 holds a copy of the key Ka until the completion of the process, therefore it must be "trusted" in two senses:
    In the memory 151 there are no backdoors by design put by the constructor,
    the memory 151 has not been compromised, e.g. by an attack from hackers.
  In order to increase trust, special methods must be applied (e.g. implementing hardware protection, ensure total erasure of the memory etc.) and proofs must be given to the user (result of audits, design documents, security penetration tests . . . ), overall increasing the cost of construction.

Therefore, the method of FIG. 4 has drawbacks that are solved by the method of FIG. 5, mainly regarding a link budget issue and the method of FIG. 5 has drawbacks that are solved by the method of FIG. 4, mainly regarding the presence of a trusted component between the user devices 21 and 22. The invention permits to switch between different services to better adapt to the will of the users.

Figure 3:
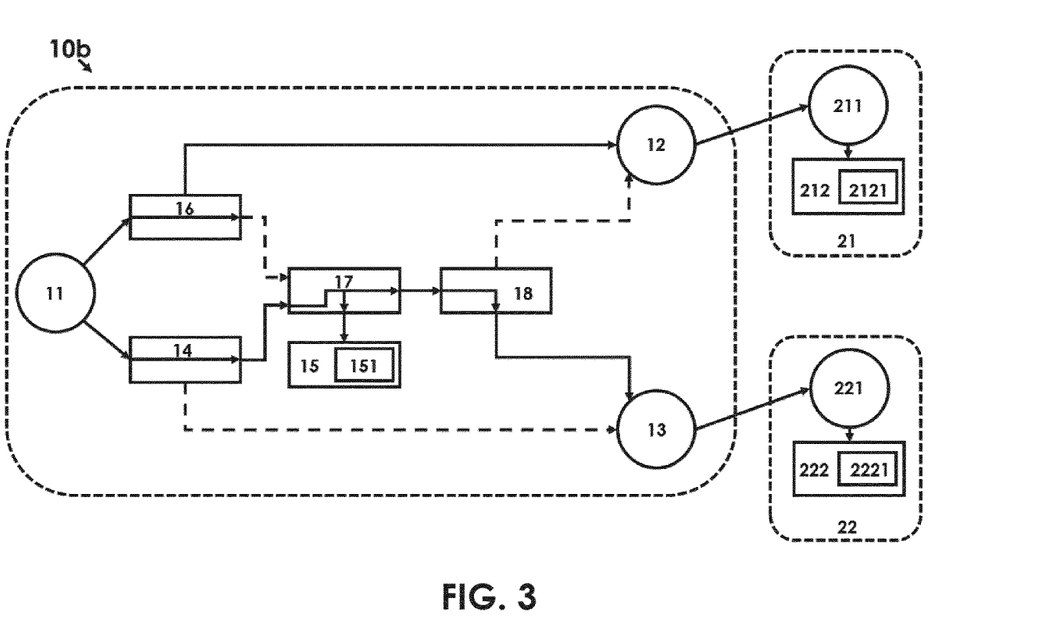
FIG. 3 is a schematic representation of a QKD system according to another embodiment of the invention.

Another embodiment of the system according to the invention is represented at FIG. 3.

FIG. 3 shows a schematic representation of a QKD system according to another embodiment of the invention.

Figure 6:
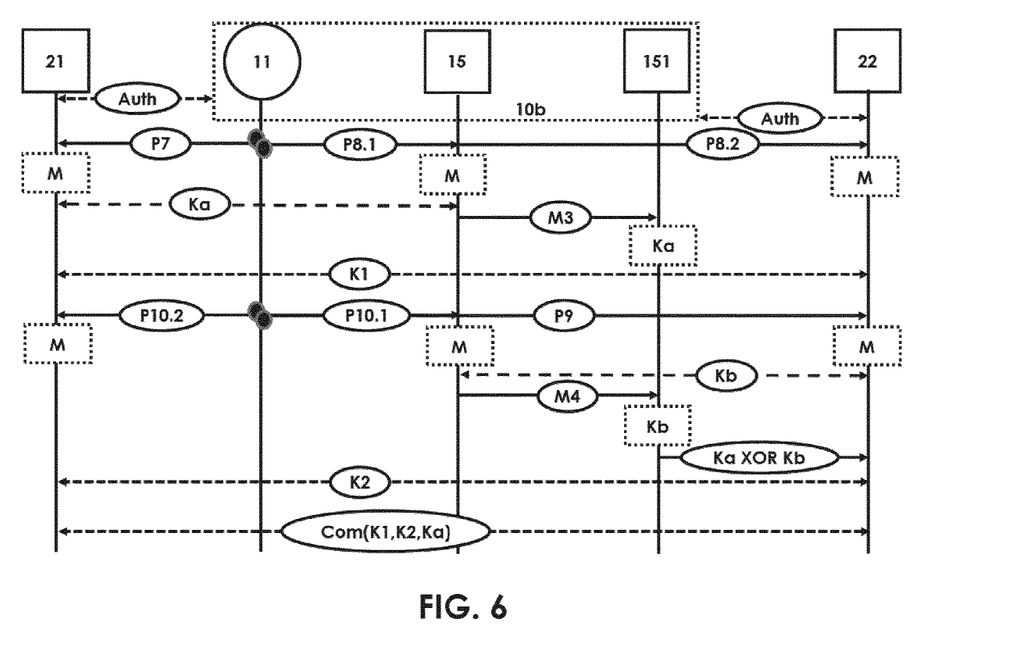
FIG. 6 is a schematic representation of a method carried out by the system according to another embodiment of the invention.

The system 10b according to another embodiment of the invention represented at FIG. 3 permits to operate both methods of FIGS. 4 and 5 at once by simply switching different optical paths of the system 10b. This is represented at FIG. 6. By having a single system able to simultaneously carry out both methods of FIG. 4 and FIG. 5, it is possible to overcome the drawbacks of both methods in one single method.

The system 10b comprises the components of the system 10a and additional components. With reference to FIG. 3, the system 10b comprises an optical switch 16 between the first output of the photon source 11 and the optical link 12. The added optical switch 16 receives photons from the photon source 11 and can route the received photons to either its first output, connected to the first optical link 12, or to its second output.

The system 10b further comprises a beam splitter 17, located between the optical switch 14 and the measurement device 15. The beam splitter 17 has two inputs and two outputs. The beam splitter 17 receives photons from its first or second outputs and splits the received photon stream between its two outputs. That is, the beam splitter for example has a 50/50 predetermined split ratio and splits evenly the received photons stream between its first and second outputs. In another embodiment, the beam splitter 17 is a tuneable beam splitter that has a tuneable predetermined split ratio. The first output of the beam splitter 17 is connected to a user device, while the second output of the beam splitter 17 is connected to the measurement device, so that some of the photons received by the beam splitter 17 can be routed towards a user device 21 or 22 and other received photons can have a property measured. Alternatively, the beam splitter 17 can only have one input and receive photons either from optical switches 14 or 16. It should be noted that the beam splitter works randomly, so there is a statistical effect where part of the photons are routed to one output, and the other part of the photons goes to the other output, randomly. After measurement, a "reconciliation" process is carried out based on the exact time of arrival of photons to reconstruct the pairs of photons, i.e. to understand which photons arrived where.

The system 10b further comprises an optical switch 18 having its input connected to the first output of the beam splitter 17, and having two outputs, the first output of the optical switch 18 being connected to the first user device 21 via the first optical link 12, and the second output of the optical switch 18 being connected to the second user device 22 via the second optical link 13. This permits to route some photons received by the beam splitter 17 either to user device 21 or to user device 22 while being able to measure a property of some other photons also received by the beam splitter 17. By appropriately configuring the input of beam splitter 17 and the output of optical switch 18, some of the photons received by 14 are measured by 15 and others are sent to 22; in another configuration, some of the photons received by 16 are measured by 15 and others are sent to 21.

The method carried out by the system 10b according to the invention is in two parts separated by at least one switching of at least one optical switch. As represented at FIG. 3, the whole system can be switched at once by switching each optical switch 14, 16 and 18. In a first part of the method, a photon stream comprising photons from at least two pairs of entangled photons is sent to the user device 21 and to the beam splitter 17, which separates the received stream in two, to route a part of the photon stream to the measurement device 15 and another part of the photon stream to the user device 22. This permits to implement both methods of FIG. 4 and of FIG. 5 at once, enabling to generate a key Ka between user device 21 and the system 10b and another key K1 between the user device 21 and the user device 22 (not known to any middleman). In a second part, after the optical switches 14, 16 and 18 have been switched, a photon stream comprising photons from at least two pairs of entangled photons is sent to the user device 22 and to the beam splitter 17, which separates the received stream in two, to route a part of the photon stream to the measurement device 15 and another part of the photon stream to the user device 21. This permits to create a third key Kb between the user device 22 and the system 10b, and a fourth key K2 between the user device 21 and the user device 22 (not known to any middleman). Therefore, this enables to implement the full method of FIG. 5 by having a key Ka between the system 10b and user device 21 and another key Kb between the system 10b and user device 22, as well as the full method of FIG. 4. As a result, the method of FIG. 6 and the system 10b of FIG. 3 make it possible to have two keys K1 and K2 established between user devices 21 and 22 in an untrusted mode, and a key Ka established between user devices 21 and 22 from the two keys established between user device 21 and system 10b and user device 22 and system 10b in a trusted mode (i.e. through a trusted component). The length of the keys can be configured according to the time dedicated to each phase; as a general rule, the rate of generation of K1 and K2 is much lower than the rate of generation of Ka, due to link budget constraints.

FIG. 6 is a schematic representation of a method carried out by the system according to another embodiment of the invention, i.e. by the "hybrid" system.

The method of FIG. 6 comprises two first authentication steps "Auth" comprising the sharing of a secret for future authentication between user device 21 and system 10b and between user device 22 and system 10b.

The method carried out by the hybrid architecture 10b of FIG. 3 then comprises a step of generating two pairs of entangled photons. The first photon of each pair will be referred to as photon stream P7. The second photon of each pair will be referred to as photon stream P8, and in particular the second photon of the first pair of entangled photons will be referred to as P8.1 and the second photon of the second pair of entangled photons will be referred to as P8.2.

The first stream of photons P7 is routed from the photon source 11 to the user device 21 via the optical switch 16 and the optical link 12. The second stream of photons P8 is routed from the photon source 11 to the beam splitter 17 via the optical switch 14. There, the stream is split in a part P8.1 and a part P8.2. Part P8.1 is routed to the measurement device 15 and part P8.2 is routed to the user device 22 through the first output of the beam splitter 17, the optical switch 18 and the optical link 13.

Then the user device 21 and the user device 22 each measure a property of the received photon(s) P7 and P8.2, enabling to create a common "short" key K1 to communicate between themselves, as in the method of FIG. 4 presented previously. Also, the user device 21 and the measurement device 15 each measure a property of the received photon(s) P7 and P8.1, enabling to create a common "short" key Ka to communicate between themselves, as in the method of FIG. 5 presented previously. The measure of the property is stored in a step M3 in the memory 151 of measurement device 15. Key Ka is then generated for future use, based on the measurement of the property. The key Ka can be stored in the memory 151 as well.

Then, the paths of system 10b are switched to carry out the second part of the method of FIG. 6. This switching comprises changing from the paths in full line to the paths in dotted lines at FIG. 3. This switching is carried out by switching the output of each of the three optical switches 14, 16 and 18.

The method then comprises a step of generating two pairs of entangled photons. The first photon of each pair will be referred to as photon stream P9. The second photon of each pair will be referred to as photon stream P10, and in particular the second photon of the first pair of entangled photons will be referred to as P10.1 and the second photon of the second pair of entangled photons will be referred to as P10.2.

The first stream of photons P9 is routed from the photon source 11 to the user device 22 via the optical switch 14 and the optical link 13. The second stream of photons P10 is routed from the photon source 11 to the beam splitter 17 via the optical switch 16. There, the stream is split in a part P10.1 and a part P10.2. Part P10.1 is routed to the measurement device 15 and part P10.2 is routed to the user device 21 through the first output of the beam splitter 17, the optical switch 18 and the optical link 12.

Then the user device 21 and the user device 22 each measure a property of the received photon(s) P9 and P10.2, enabling to create a common "short" key K2 to communicate between themselves, as in the method of FIG. 4 presented previously. Also, the user device 22 and the measurement device 15 each measure a property of the received photon(s) P9 and P10.1, enabling to create a common "short" key Kb to communicate between themselves, as in the method of FIG. 5 presented previously. The measurement of the property and/or the Key Kb generated based on the measurement are transferred in a step M4 to the memory 151 of measurement device 15.

As in the method of FIG. 5, as the user device 21 and system 10b share an encryption key Ka, and the user device 22 and system 10b share an encryption key Kb, the user devices 21 and 22 can communicate as any device or component comprised in the system 10a sends the key Ka encrypted with the key Kb to user device 22 in a step "XOR", so that user device 22 then knows the key Ka and can communicate with the user device 21 using this key Ka. Note that this also works when any device or component comprised in the system 10b sends the key Kb encrypted with the key Ka to user device 21 so that user device 21 then knows the key Kb and can communicate with the user device 22 using this key Kb.

The proposed architecture is innovative in that it permits in in a hybrid manner:
To achieve "short" keys K1 and K2 from the untrusted mode of FIG. 4 directly between user device 21 and 22,
To achieve a "longer" key Ka from the trusted mode of FIG. 5 between either user device 21 or user device 22 with the onboard measurement device 15, followed by an onboard XOR operation of Ka from user device 21 and Kb from user device 22, the two keys being alternatively exchanged by user device 21 and user device 22 with the on-board measurement device 15,
The proportion of keys generated in trusted and untrusted mode can be tuned by means of a tuneable beam splitter, based on the desired trust level. If the chance of eavesdropping is low, then a higher percentage of trusted key can be generated while if ultimate security is needed, a higher percentage of keys in untrusted mode can be generated by modifying the splitting properties of the tuneable beam splitter.

Thanks to general rules of Privacy Amplification, not part of the present patent, it is possible to consider that K1, K2 and Kb can be combined using a hash function or other algorithm to create a uniform (equal probability for all bit outcomes) and secure key K3 which can be used for encryption. Denoting with L(.) the length of a key k, we have $L(K1)+L(K2) \leq L(K3) \leq L(K1)+L(K2)+L(Kb)$; further modelling of the probability that all or parts of Kb are compromised in trusted mode is required in order to properly define the final length of the resulting key. For this the conditional min-entropy can be used. Here, given a key K2 generated in trusted mode, then based on live observations of information variables related to K2 (e.g. the parity of a group of bits in K2, value of certain bits in K2), the conditional min-entropy of K2 can be determined. Under the assumption that the probabilities of a possible compromise can be simulated sufficiently well, a suitable hash function can be applied on input K1 and K2 to obtain a uniformly random key K3. This allows maximum flexibility for the user of the system to choose appropriate parameters to determine the length of the absolutely secure keys (K1, K2), the length of the "trusted" key (Ka), and the length of the final key (K3). The parameters can change for each user and also change over time, i.e. they are not fixed in the system.

The above feature linked to the hybrid operational mode of FIG. 6 can largely improve the attractiveness of the overall system as it permits to obtain the maximum possible key length based on the estimated probability of eavesdropping (or, equivalently, the expected amount of key bits known to an attacker), by mixing keys obtained with two different methods.

Another general consideration is associated to the capability of implementing variable split ratio by the beam splitter 17, so as to properly size the amount of K1, K2 and Kb keys associated to untrusted and trusted mode BBM92, enabling an overall optimization of key lengths on the basis of photon transmission conditions:
On the basis of accurate meteorological condition predictions, one could start with trusted mode of FIG. 5 if weather condition (e.g. cloud coverage) are not optimal for untrusted mode of FIG. 4 in which two simultaneous lines of sight are needed to send the entangled photons to ground-based user devices 21 and 22, thus configuring a splitting function which provides a few simultaneous photons to user devices 21 and 22;
Then, proper reconfiguration could privilege the untrusted mode of FIG. 4 when permitted by the weather.

The splitting ratio also depends on the expected 'trustiness' of the key generated in trusted mode, determined by the probability of selected information variables related to the generated key in trusted mode. If the probability of compromise of (parts of) the key (Kb) is high, then more photons are needed for the untrusted mode of FIG. 4. Alternatively, the number of photons send in the trusted mode of FIG. 5 can be increased if the model predicts low chance of compromise. The system allows to change these parameters for each user, and over time, therefore is especially suited for applications (such as deployment on satellites) where the same hardware will be used for a long period of time and cannot be changed easily.

The invention claimed is:

1. An entangled photons distribution and measurement system comprising:
a photons source comprising a first and second outputs, the photons source being adapted to generate a pair of entangled photons comprising a first and second photons, the first photon being emitted on the first output and the second photon being emitted on the second output,
a first optical link connected to the first output of the photons source, the first optical link being configured to deliver the pair of entangled photons to a first device,
a first optical switch connected to the second output of the photons source and comprising a first and second outputs, the first optical switch being configured to route photons from the second output of the photons source to the first output of the first optical switch or to the second output of the first optical switch,
a second optical link connected to the first output of the first optical switch, the second optical link being configured to deliver the pair of entangled photons to a second device,
a measurement device connected to the second output of the first optical switch, and
a memory connected to the measurement device,
wherein the first optical switch is configured to switch between the first and second outputs of the first optical switch to switch between two operating modes of the system.

2. The entangled photons distribution and measurement system according to claim 1, further comprising:
a second optical switch located between the first output of the photons source and the first optical link, the second optical switch comprising a first and second outputs, the first output of the second optical switch being connected to the first optical link,
a beam splitter located between the second output of the first optical switch and the measurement device, the beam splitter comprising a first and second inputs and a first and a second outputs, the first input of the beam splitter being connected to the second output of the second optical switch, the second input of the beam splitter being connected to the first output of the first optical switch, the first output of the beam splitter being connected to a third optical switch and the second output of the beam splitter being connected to the measurement device, the beam splitter being configured to split received photon streams between the first and second outputs of the beam splitter, the splitting verifying a predetermined split ratio between the first and second outputs of the beam splitter, and the third optical switch comprising an input connected to the first output of the beam splitter and a first and second outputs, the first output of the third optical switch being connected to the second optical link and the second output of the third optical switch being connected to the first optical link, wherein the second optical switch is configured to switch between the first and second outputs of the second optical switch and the third optical switch is configured to switch between the first and second outputs of the third optical switch, the second optical switch and the third optical switch being configured to switch simultaneously with the first optical switch so as to switch between the two operating modes of the system.

3. The entangled photons distribution and measurement system according to claim 2, wherein the beam splitter is adapted to vary the predetermined split ratio.

4. A Quantum Key Distribution method carried out by the entangled photons distribution and measurement system according to claim 2, the method comprising:

generating at least a first and a second pairs of entangled photons by the photons source, the first pair of entangled photons comprising at least a first and a second entangled photons, the second pair of entangled photons comprising at least a first and a second entangled photons, routing the first entangled photons of the first pair of entangled photons and the first entangled photons of the second pair of entangled photons via the second optical switch and via the first optical link to deliver the two first entangled photons of the first and second pairs of entangled photons to the first device, routing the second entangled photon of the first pair of entangled photons via the first optical switch, via the beam splitter and via the second optical link to deliver the second entangled photon of the first pair to the second device, routing the second entangled photon of the second pair of entangled photons via the first optical switch and via the beam splitter to deliver the second entangled photon of the second pair of entangled photons to the measurement device, measuring, by the measurement device, a property of the received second entangled photon of the second pair of entangled photons and storing, in the memory, the measure of the property of the received second entangled photon of the second pair of entangled photons, generating a first cryptographic key based on the measure of the property of the received second entangled photon of the second pair of entangled photons, switching the first optical switch from the first output of the first optical switch to the second output of the first optical switch, switching the second optical switch from the first output of the second optical switch to the second output of the second optical switch, switching the third optical switch from the first output of third first optical switch to the second output of the third optical switch, generating at least a third and a fourth pairs of entangled photons by the photons source, the third pair of entangled photons comprising at least a first and a second entangled photons, the fourth pair of entangled photons comprising at least a first and a second entangled photons, routing the first entangled photons of the third pair of entangled photons and the first entangled photons of the fourth pair of entangled photons via the first optical switch and via the second optical link to deliver the two first entangled photons of the third and fourth pairs of entangled photons to the second device, routing the second entangled photon of the third pair of entangled photons via the second optical switch, via the beam splitter and via the first optical link to deliver the second entangled photon of the third pair of entangled photons to the first device, routing the second entangled photon of the fourth pair of entangled photons via the second optical switch and via the beam splitter to deliver the second entangled photon of the fourth pair entangled photons to the measurement device, measuring, by the measurement device, a property of the received second entangled photon of the fourth pair of entangled photons and storing, in the memory, the measure of the property of the received second entangled photon of the fourth pair of entangled photons, generating a second cryptographic key based on the measure of the property of the received second entangled photon of the fourth pair of entangled photons, and sending the first cryptographic key to the first device, wherein the first cryptographic key is encrypted using the second cryptographic key.

5. The entangled photons distribution and measurement system according to claim 1, wherein the system is embedded in a satellite and the first and second optical links are formed by optical trains, sending and receiving telescopes and free space channel between the sending and receiving telescopes.

6. The entangled photons distribution and measurement system according to claim 1, wherein the system in one of the two operating modes is adapted to carry out an entanglement-based trusted Quantum Key Distribution protocol and in the other of the two operating modes the system is adapted to carry an entanglement-based untrusted Quantum Key Distribution protocol.

7. A Quantum Key Distribution method carried out by the entangled photons distribution and measurement system according to claim 1, the method comprising:

generating at least a first pair of entangled photons by the photons source, the first pair of entangled photons comprising at least a first entangled photon and a second entangled photon, routing the first entangled photon of the first pair of entangled photons via the first optical link to deliver the first entangled photon to the first device and the second entangled photon of the first pair of entangled photons via the first optical switch and via the second optical link to deliver the second entangled photon to second devices, switching the first optical switch from the first output of the first optical switch to the second output of the first optical switch, generating at least a second pair of entangled photons by the photons source, the second pair of entangled photons comprising at least a first and a second entangled photons, routing the first entangled photon of the second pair of entangled photons via the first optical link to deliver the first entangled photon of the second pair of entangled photons to the first device and the second entangled photon of the second pair of entangled photons via the first optical switch to deliver the second entangled photon of the second pair of entangled photons to the measurement device, measuring, by the measurement device, a property of the received second entangled photon of the second pair of entangled photons and storing, in the memory, the measure of the property of the received second entangled photon of the second pair of entangled photons, generating a first cryptographic key based on the measure of the property of the received second entangled photon of the second pair of entangled photons, generating at least a third pair of entangled photons by the photons source, the third pair of entangled photons comprising at least a first and a second entangled photons, routing the first entangled photon of the third pair of entangled photons via the second optical link to deliver the first entangled photon of the third pair of entangled photons to the second device and the second entangled photon of the third pair of entangled photons via the first optical switch to deliver the second entangled photon of the third pair of entangled photons to the measurement device, measuring, by the measurement device, a property of the received second entangled photon of the third pair of entangled photons and storing, in the memory, the measure of the property of the received second entangled photon of the third pair of entangled photons, generating a second cryptographic key based on the measure of the property of the received second entangled photon of the third pair of entangled photons, and sending the first cryptographic key to the first device, wherein the first cryptographic key is encrypted using the second cryptographic key.

8. A non-transitory computer-readable medium comprising instructions which, when executed by a computer, cause the computer to carry out the method according to claim 7.

* * * * *